July 10, 1956
R. G. CLARK
2,753,839
SPARK PLUG ANTI-SEIZE APPLICATOR
Filed Sept. 10, 1953
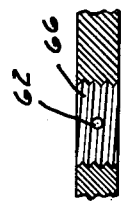
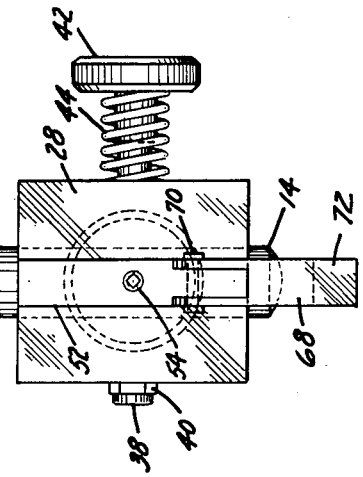
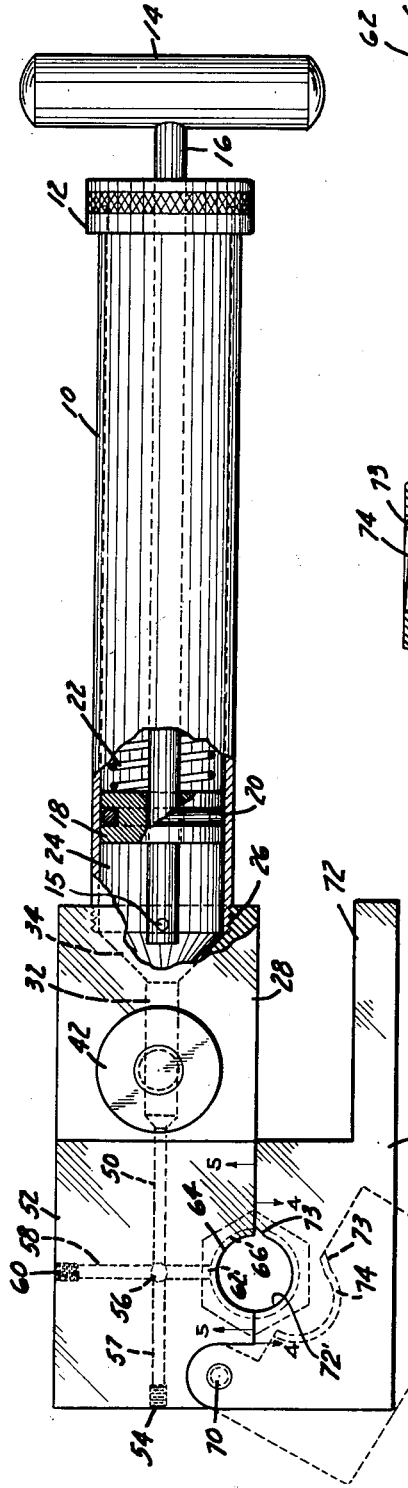
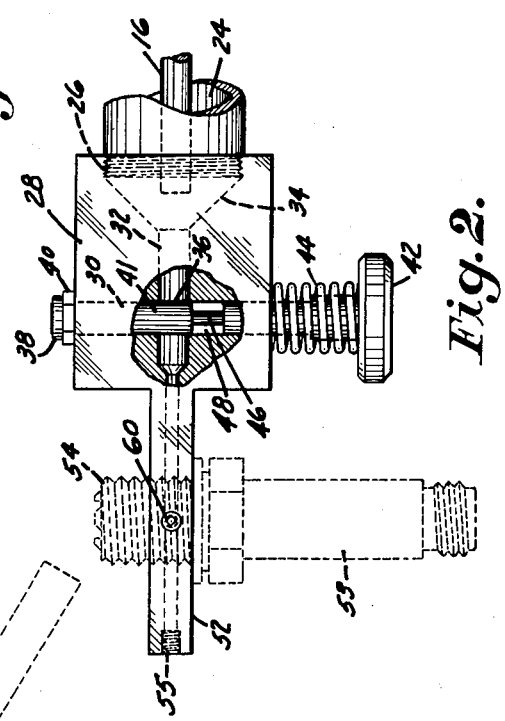
INVENTOR.
Robert G. Clark
BY United States Patent Office 2,753,839
Patented July 10, 1956

2,753,839

SPARK PLUG ANTI-SEIZE APPLICATOR

Robert G. Clark, Carter, S. Dak.

Application September 10, 1953, Serial No. 379,324

3 Claims. (Cl. 118—410)

This invention relates to the application of anti-seize lubricant of graphite or other material. In airplane mechanics it is well known that spark plugs need to be lubricated whenever they are installed. If this is not done spark plugs will freeze into their sockets and become extremely difficult if not impossible to remove.

The object of the present invention is to reduce the time involved in the routine lubrication of spark plugs in airplane motors. However, it is not the desire of the applicant to confine himself to use of his device to this field alone.

It is easily conceivable that this same principle could be used in any sort of motor where lubrication of the threads of a spark plug is a desirable aim.

It is well known among airplane mechanics that speed in the maintenance of airplane motors is sometimes crucial, and if not crucial it is always a desirable end since expediency and efficiency in handling these detail and routine items of servicing and maintenance of a motor is always advantageous.

The time and the effort of the operator are used to the fullest advantage.

The task of applying lubricants to a spark plug is now measured in minutes. The device of the inventor has now made possible the measuring of this time in seconds. In comparison with actual present practice, the time has been cut, conservatively estimated, to approximately one tenth.

The time now consumed in lubricating the threads of one spark plug is from 45 seconds to one minute. In the hands of an operator, the device of the present invention performs the same task in three to five seconds.

Even more important than the time saving element, a uniform charge of lubricant is emitted and the lubricant is evenly distributed along the threads.

A further object of the invention and closely allied to the above-mentioned evenness in lubrication, is the provision of a manually operated, or a thumb pressed valve which is opened to release a charge of lubricant to the threads of the plug and closed by automatic spring activated means.

A further object of the invention is the provision of a chamber which contains lubricant wherein the lubricant is held constantly under a predetermined pressure, so that when the passage from the chamber to the spark plug is unobstructed, the charge is applied automatically.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

In the drawings:

Figure 1 is a top plan view of the device in one of its operative positions partly in cross section with portions of the plunger casing broken away.

Figure 2 is an elevation with portions of the casing cut away.

Figure 3 is a left end view of the applicator as seen in Figure 1.

Figure 4 is a cross sectional view looking in the direction of the arrows 4—4 and taken along the line indicated at 4—4.

Figure 5 is a cross sectional view taken along the line 5—5 of Figure 1 and looking in the direction of the arrows 5—5.

Lubricant material is held under pressure of a spring 22 within a chamber 24. The chamber 24 forms part of the space within a casing 10.

A handle 14 has rigid connection by means of screw threads or other means (not shown) to one end of a rod 16, which latter is slidably received in an opening in a cap 12. The knurled cap 12 has screw engagement with the rearward end of the casing 10, and is used as hereinafter described for replenishing lubricant within the lubricant containing chamber.

The rod 16 extends through an aperture in a piston 18 which latter is disposed interiorly of the casing 10. The forward end of the rod 16 is provided with an aperture for receiving a pin 15 therethrough. The pin 15 extends outwardly a short distance on either side of the rod 16 and is for the purpose of preventing the piston from becoming disengaged from the rod and when the cap 12 is disengaged from the rearward end of the casing 10, facilitates the removal of the piston by pulling outwardly on the rod handle 14. A tight fitting connection between the piston 18 and the interior surface of the casing 10 is provided by means of an O ring 20 of rubber or other desired material.

A coiled spring 22 has one of its ends seated against the rearward side of the piston 18 and at its opposite end seated against the inner surface of the cap 12, so that pressure is exerted upon the piston 18 and of necessity upon the fluid lubricant or other material placed within the chamber 24. This chamber will be seen to be a portion of the interior of the casing 10 disposed upon the opposite side of the piston 18 from the sring 22. The rod 16 is slidable through the piston 18, or rather the piston 18 is slidable with respect to the rod 16 so that pressure is always exerted upon the material placed within the chamber 24. This constant pressure is possible by means of the constant pressure exerted by the spring 22.

The forward end of the casing 10 is provided with exterior screw threads which engage in complementary screw threads in a block casing 28. The block 28 has cylindrical passageways 30 and 32 which extend at right angles to one another and communicate at a juncture 36 which becomes the passageway for fluid lubricant. The chamber 24 communicates with the passageway through a conically shaped opening 34 as shown in the drawing but could conceivably be any other configuration within the scope of the claims.

A lubricant injection control plunger 38 extends the entire length of the opening 30 and is slidable throughout its length. The plunger 38 protrudes from the block 28 at both ends. One end of the plunger 38 threadedly receives a nut 40 which holds the plunger 38 within the opening 30 and also acts as a stop as later described and the opposite end is provided with a thumb press button 42. The plunger 38 is held in a closed position by means of a spring 44 disposed about the plunger shaft and having one of its ends seated against the block 28 and its opposite end seated against the under surface of the thumb button 42.

The plunger 38 has a close fit with the boring 30 throughout the entire length of the boring with the exception of a portion 46 which is reduced in diameter. The area 48 around this reduced portion becomes the passageway for the fluid lubricant at times when the button 42 is pushed inwardly so that the area 48 communicates with and becomes part of the passage 36.

The above described mechanism is in actual operation a valve, so constructed as to be manually opened and automatically closed.

The lower end portion 41 of the plunger 38 is of such length as to become a stop or block or close-off for the passage 32 when the plunger 38 is held in a closed position by the tension of the spring 44.

The passageway 32 extends further inwardly a short distance past the control plunger opening and becomes reduced in diameter as shown at 50 and extends into a member 52. The member 52 is part of the means for physically engaging the threads of a spark plug 53 while its threads 54 are receiving lubricant. The passageway 50 may extend completely through the block 52. In this event the passageway is closed at its outer end by a removable Allen screw 55. The passageway 50 joins a similar passageway 58 in the block 52 at 56, the passageway 58 being positioned at right angles to the passageway 50.

The outer end of the passageway 58 is closed off at the surface of the block by means of a removable Allen screw 60. The inner end 62 of the passageway 58 opens into a semi-circularly shaped cut-out portion, as seen in top plan view, of the edge of the block member 52. This cut-out portion 64 is provided with screw threads as shown at 66. These screw threads 66 are complementary to and adapted to engage screw threads 54 of a spark plug 53.

A gate portion 68 is hinged to the block 52 secured thereto by means of a pin 70 and is provided with a manually manipulated handle portion 72. The gate portion 68 is provided with a semi-circular cut-out portion 72', complemental to and in alignment with the cut-out portion 64 of the block 52 and is also provided with sparkplug engaging threads 74.

In operation, the operator causes the gate portion 68 to swing outwardly pivoting around the pivot pin 70 by pushing outwardly on the handle 72 whereby the gate portion 68 assumes a position as shown in dotted lines in Figure 1. The threaded end of a spark plug 53 is then inserted into and in contact with the cut-out portion 64 while the gate portion 68 is brought back into a closed position, as shown in full lines in Figure 1, whereby the threads 66 and 74 of the respective cut-out portions 64 and 72' closely engage the threads 54 of the spark plug 53. The action as described could be called or likened to a clamping action and the gate portion 68 is held in a closed position by the hand of the operator.

At the time the spark plug is held in the position as above described, the control plunger 38 is actuated by pressing downward with the thumb on the thumb button 42 whereby the plunger is forced downwardly opening the valve and allowing passage of lubricant. The lubricant, being under continuous pressure, flows into and through passages 50 and 56, through the opening 62 and onto the adjacent portion of the threads 54 of a spark plug 53. At times when lubricant is flowing outwardly of the opening 62, the spark plug is rotated by hand within the threads whereby a uniform and continuous coating of lubricant is applied to the essential ones of the threads of the spark plug 53, the unexposed threads of the plug 53 coming into position for lubrication.

The passage 50 may be extended as indicated by 57 to the outer edge of the block. The Allen screws 54 and 60 can be removed for purposes of cleaning the passages 50, 57 and 58.

The rearwardmost point at which the semi-circularly shaped cut-out portion 72' meets the inwardly facing edge of the gate portion 68 is cut into a beveled off portion 73 and is provided to prevent binding or contact with the spark plug, even during the arcuate motion of the block 68 about its pivot pin 70.

From the foregoing description, it is thought to be obvious that a spark plug anti-seize applicator constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In an anti-seize applicator for spark plugs, means for holding a spark plug, said means comprising a block, said block provided with a screw threaded opening of such thread pitch as to complement and contain the threads of a spark plug, said block comprising two separate sections engageable with each other along a diametric plane through said screw threaded opening and parallel with the axis of said opening, a hinge connection means between the two sections of said block whereby one section can be moved away from the other to permit insertion of a spark plug into a half-portion of said opening and can be moved toward the other for holding the spark plug, a passageway within one section of said block, said passageway opening at one end into the screw threaded opening for passage therethrough of anti-seize to said spark plug threads, manually controllable valve means partially within said passageway for opening and closing said passageway, and means connected to the other end of said passageway for delivering anti-seize to said passageway under continuous pressure.

2. The combination defined in claim 1 in which the wall of said opening has a beveled corner on one of said block sections opposite said hinge means to provide clearance for clamping about the spark plug.

3. In an anti-seize applicator for spark plugs, a block having two sections, each section having a one-half portion of a threaded opening therein whereby each block section has a concave threaded recess therein opening toward and disposed exactly opposite the concave recess of the other block section, the walls of said threaded opening being comprised of said threaded recesses and being complemental to the threads of a spark plug for receiving the threaded end of a spark plug therein, one of said block sections having a passageway leading through it to its said threaded recess, means connected to said passageway for delivering anti-seize to said passageway, manually controllable valve means partially disposed in said passageway for controlling passage of anti-seize through said passageway, and means for inter-connecting said block sections in a way permitting a movement of said block sections toward and away from each other sufficiently to permit the insertion and release of a spark plug into and from the walls of said opening.

References Cited in the file of this patent

UNITED STATES PATENTS

| 1,254,514 | Lehmann | Jan. 22, 1918 |
| 1,286,398 | Onan | Dec. 3, 1918 |
| 1,510,492 | Caron | Oct. 7, 1924 |
| 2,663,213 | Davidson | Dec. 22, 1953 |

FOREIGN PATENTS

| 413,454 | Germany | May 11, 1925 |
| 655,025 | Switzerland | July 1, 1929 |